United States Patent [19]

Philip et al.

[11] Patent Number: 5,674,383
[45] Date of Patent: Oct. 7, 1997

[54] FILTER FOR THE PURIFICATION OF WATER

[75] Inventors: Hervé Philip, Pignan; Siegfried Maunoir, Montpellier, both of France

[73] Assignee: Eparco, Societe Anonyme, Paris, France

[21] Appl. No.: 404,266

[22] Filed: Mar. 14, 1995

[30] Foreign Application Priority Data

Mar. 14, 1994 [FR] France ................... 94 02952

[51] Int. Cl.$^6$ ........................................ B01D 24/24
[52] U.S. Cl. ........................ 210/104; 210/259; 210/266; 210/291
[58] Field of Search ........................ 210/631, 747, 210/104, 170, 259, 266, 289, 290, 291, 532.2, 416.1

[56] References Cited

U.S. PATENT DOCUMENTS

| | | | |
|---|---|---|---|
| 2,233,981 | 3/1941 | Jewell | 210/130 |
| 4,094,790 | 6/1978 | Schmidt | 210/291 |
| 4,184,947 | 1/1980 | Demisch | 210/631 |
| 4,379,050 | 4/1983 | Hess et al. | 210/291 |
| 4,818,384 | 4/1989 | Mayer | 210/288 |
| 5,084,163 | 1/1992 | Baumann et al. | 210/291 |

FOREIGN PATENT DOCUMENTS

| | | |
|---|---|---|
| 352288 | 8/1905 | France . |
| 1117456 | 5/1956 | France . |
| 1275586 | 10/1961 | France . |
| 191587 | 9/1906 | Germany . |

*Primary Examiner*—Ivars Cintins
*Attorney, Agent, or Firm*—Young & Thompson

[57] ABSTRACT

A filter (1) for the purification of water comprises an inlet (2) for water to be treated, an outlet (3) for treated water, filtration elements interposed between the inlet and the outlet. The filtration elements comprise two networks (5, 6) of tubes respectively for distribution and drainage associated respectively with the inlet (2) and the outlet (3), disposed substantially opposite and spaced from each other and provided with perforations (7) distributed longitudinally along their transverse walls, filter material (8) interposed between the two networks (5, 6), and distribution elements associated with the network (5) of distribution tubes (5a) and adapted to ensure a diffusion of the water to be treated toward the filter material (8).

20 Claims, 2 Drawing Sheets

5,674,383

FILTER FOR THE PURIFICATION OF WATER

FIELD OF THE INVENTION

The invention relates to a filter for the purification of water, particularly domestic waste water after preliminary pretreatment in a septic tank before discharge to a natural medium, a system for treatment of water comprising such a filter, as well as a septic tank comprising such a filter.

BACKGROUND OF THE INVENTION

There are already known filters for the purification of water which comprise an inlet for the water to be treated, an outlet for treated water and filtration means interposed between the inlet and the outlet. These filtration means are generally in the form of tubes adapted to distribute the water in a layer of sand having a filtering function.

This state of the art is particularly shown in FR-A-352 288, FR-A-1 117 456, FR-A-1 275 586, U.S. Pat. No. 2,233,981, DE-C-191 587.

It is also known that the spreading can take place directly in natural soil.

However, the first characteristic required for a good purification filter is to obtain a good compromise between the quality of distribution of the water and the quality of the purification, namely a good aeration of the filter. In known filters, this characteristic is obtained at the detriment of the surface used by the filter which is large. Thus, for spreading in natural soil, it is necessary to use a surface of about 10 m² per 150 l of water load, and for a filter comprising a layer of sand the surface is brought to 3 m², which is still too large.

SUMMARY OF THE INVENTION

The invention has for its object to overcome this drawback. It has for its object a filter for the purification of water which permits obtaining a good output, which is to say a good distribution and a good purification of the water while using a reduced surface.

To this end, the invention provides a filter for the purification of water of the type comprising:

an inlet for water to be treated an outlet for treated water filtration means interposed between the inlet and the outlet characterized by the fact that the filtration means comprise two networks for tubes, respectively for distribution and for drainage, associated respectively with the inlet and the outlet, disposed substantially facing and spaced from each other, and provided with perforations distributed longitudinally along their transverse walls, filtering means interposed between the two networks, and distribution means associated with the network of tubes for distribution and adapted to ensure a diffusion of the water to be treated toward the filtering means.

It moreover provides a treatment system for water comprising a discontinuous supply system which can be constituted by a tank comprising, associated with the inlet of a filter according to the invention, either a siphon that can be started by a pressure bell, or a swinging spout, or an electric pump with a high and low level detector.

The supply of the filter with water is no longer continuous but batchwise and this permits therefore an even better distribution of the water.

Finally, the invention provides a septic tank comprising a pretreatment system associated with the treatment system described above.

BRIEF DESCRIPTION OF THE DRAWINGS

Other characteristics of the invention will appear from the description which follows with reference to the accompanying drawings in which.

DETAILED DESCRIPTION OF THE INVENTION

Figure 1:
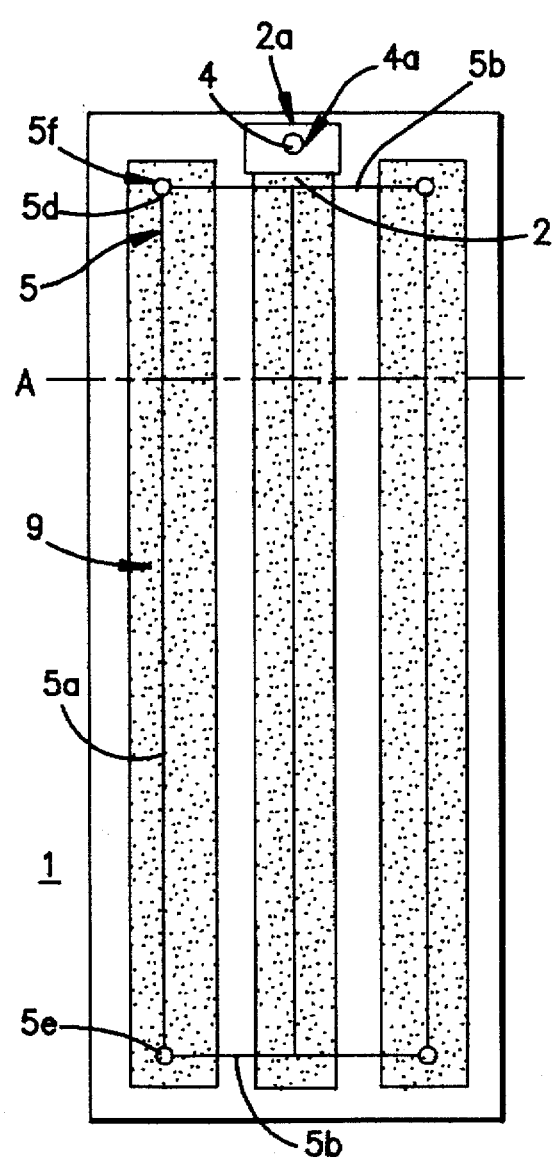
FIG. 1 is a top plan view of a filter according to the invention.

The invention relates to a filter 1 for the purification of water, particularly domestic waste water, which comprises an inlet 2 for water to be treated, and outlet 3 for treated water and filter means interposed between the inlet and the outlet.

The filter 1 is supplied with water to be treated, at its inlet 2 by means of a siphon 4 startable by a pressure bell located in a supply tank 4a. The siphon 4 receives water to be treated from a pretreatment system (not shown) constituted for example by a septic tank.

In the embodiment shown in FIG. 1, the startable siphon 4 disposed in the supply tank 4a is contained in the filter 1. The filter 1 can however be separate from the siphon 4. The inlet of the filter corresponds therefore in this case to the inlet 2a of the siphon 4 located in the supply tank 4a, this siphon 4 supplying then the inlet of filter 1.

The invention also relates to a treatment system for water comprising a discontinuous supply system such as a tank 4a in which is located the siphon 4 startable by a pressure bell located also in the filter 1 whose inlet 2 is supplied by the siphon 4.

This startable siphon 4 provides batchwise supply of the filter 1 with water to be treated. The supply no longer being continuous, the starting of the siphon 4 can be adjusted such that the filter will not receive a batch of water to be treated unless the preceding batch is through. This permits obtaining a better distribution of the water in the filter as well as a better purification.

According to other embodiments, the siphon 4 could be replaced by a swinging spout or an electric pump with a high and low level detector.

In the treatment system in question, the filter 1 is disposed substantially horizontally and at the surface of the ground. It can however be partially or totally buried.

According to the invention, the filtration means of the filter 1 comprise:

two networks of tubes 5, 6 respectively for the distribution and drainage associated respectfully with the inlet 2 and outlet 3 disposed substantially opposite each other and spaced from each other and provided with perforations 7 distributed longitudinally along their transverse walls;

filter means 8 interposed between the two networks 5 and 6 and distribution means 9 associated with the distribution tube network 5 and adapted to ensure a diffusion of the water to be treated toward the filter means 8.

The filter means 8 are in the form of a layer of granular filtrant. This granular filtrant layer 8 is of a material which is basically siliceous and comprises more particularly grains of zeolite, having a granulometry comprised between about 0.1 and 10 mm. The thickness of the layer 8 is comprised between 0.5 and 1 m, it is preferably 60 cm. This layer comprises for example either granules all between 2 and 5 mm, or two sublayers, an upper one of 2 to 5 mm and a lower one of 0.2 to 2 mm. The granules of zeolite permit, thanks to the presence of intergranular interstices, an excellent circulation of air and hence a good increase of purifying microorganisms. The zeolite fixes the purifying biomass and thus permits a good output for elimination of the carbonated polluting charge of the effluent.

On the other hand, zeolite is constituted by microporous grains which permit a gravity flow of water between the grains in case of a high flow rate, and by capillarity from one grain to the other in the case of a low flow rate.

Finally, the zeolite has interesting properties for the elimination of nitrogenous pollution.

According to the invention, the distribution tube network 5 is adjacent a first surface 8a of the layer of granular filtrant 8. It can be situated outside or inside of this granular filtrant 8.

Figure 3:
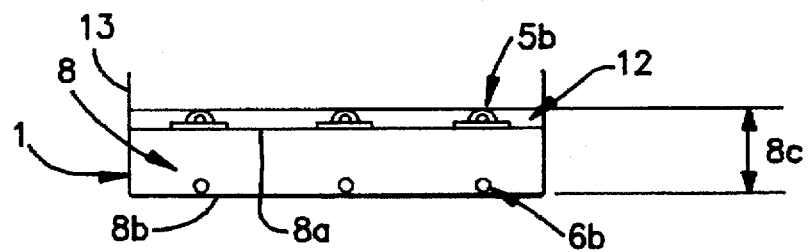
FIG. 3 is a cross-sectional view of the filter, on the line A-A' of FIGS. 1 and 2.

In the embodiment shown in FIG. 3, the distribution tube network 5 is disposed outside the granular filtrant layer 8.

On the other hand, this distribution tube network 5 is provided with chemneys 5 permitting its aeration.

Similarly, the drainage tube network 6 is adjacent a second surface 8b of the layer 8 of granular filtrant. It can also be situated outside or inside the granular filtrant layer 8. In the embodiment shown in FIG. 3, the drainage tube network 6 is disposed within the granular filtrant layer 8.

The distribution tube network 5 comprises at least one layer of several distribution tubes 5a spaced transversely from each other and in communication with each other particularly adjacent the inlet 2 of the filter 1.

According to the embodiment shown in FIG. 1, the distribution tubes 5a are in communication with each other via communication tubes 5b disposed transversely relative to the longitudinal axis 5c of the distribution tubes 5a at their ends 5d, 5e. The distribution tubes 5a are preferably of PVC and have a diameter of about 40 mm.

The distance d which separates the longitudinal axes 5c of distribution tubes 5a is preferably about 1 meter.

The drainage tube 6 comprises at least one layer of several drainage tubes 5b spaced transversely from each other and in communication with each other adjacent the outlet 3 of the filter 1.

In the embodiment illustrated (FIG. 2), the drainage tube network 6 has the same configuration as the distribution tube network 5. The drainage tubes 6a are therefore in communication with each other via communication tubes 6c disposed at the ends 6d, 6e of the drainage tubes 6a transversely relative to the longitudinal axis 6d of the drainage tubes 6a. The communication tubes 6b located at the end 6e of the drainage tubes 6a are in communication with the outlet 3 of the filter 1.

The drainage tubes 6a are also preferably of PVC and have a diameter of about 100 mm.

The distance d which separates the axes 6b of the drainage tubes 6a is in this case the same as in the case of the distribution tube network 5.

The distribution means 9 associated with the distribution tube network 5 are in the form of a layer for adsorption and diffusion of water interposed between the distribution tube network 5 and the filter means 8, namely the layer 8 of granular filtrant.

In one preferred embodiment of the invention, the distribution means 9 are in the form of strips 9a for adsorption and for diffusion of the water, preferably about 50 cm in width, these strips 9a being interposed between the distribution tube network 5 and the filter means 8.

This layer or these strips 9a for adsorption and diffusion comprise a geotextile of a weight of about 750 g/m$^2$ and can be present in the direction of diffusion of the water, in the form of a drainage layer 9b and of a fine filter layer 9c preferably polypropylene.

Thus, because of the increase of the purifying microorganisms, the geotextile progressively loses a portion of its permeability and diffuses the water to be treated progressively toward the granular filtrant layer 8, giving rise to an improvement of the distribution of the surface water. In the case of the use of strips 9a for absorption and diffusion and in the embodiment in question, the distribution tubes 5a are disposed in the midportion of the absorption and diffusion strips 9a.

According to the invention, the distribution tubes 5b are provided with perforations 7a distributed longitudinally along their transverse walls and disposed substantially perpendicular to the thickness 8c of the layer 8 of granular filtrant.

Figure 4:
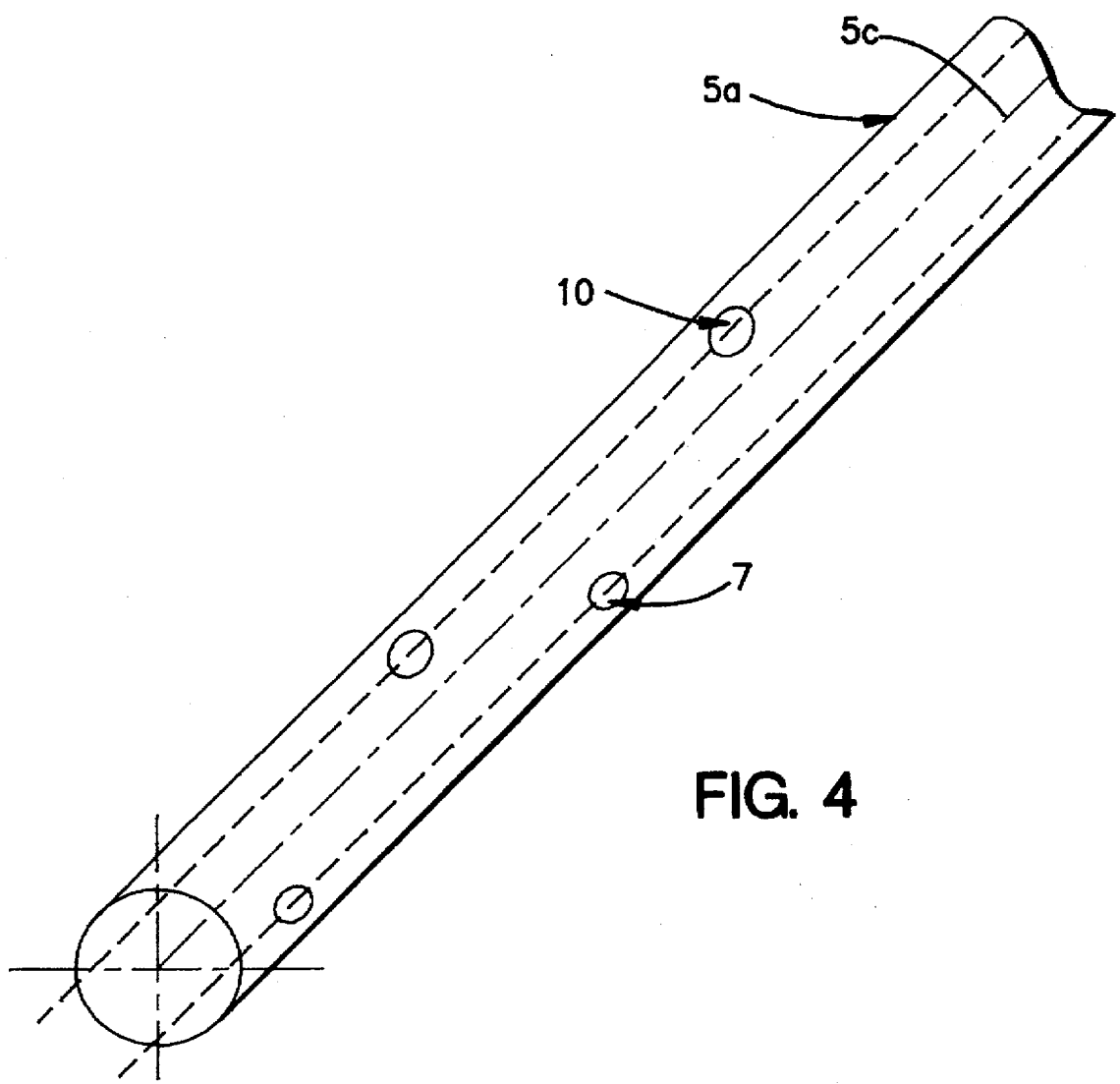
FIG. 4 is a perspective view of a distribution tube of the network of distribution tubes of a filter according to the invention.

Accordingly to FIG. 4, the perforations 7 are of cylindrical shape and have a diameter of at least 8 mm so as not to risk being plugged.

These perforations 7 are distributed longitudinally with an interval of about 30 cm which permits good distribution of the water while using all of the perforations 7 present along the distribution tubes 5a.

To maintain good distribution of the water in the case of high flow rate, the distribution tubes 5a are also provided with wider openings 10 distributed also longitudinally but opposite the first surface 8a of the layer 8 of granular filtrant. These wider openings 10 preferably have a diameter of 10 mm and are disposed in alternation with the perforations 7.

In the case of a high inlet flow rate, the passage of excess water is thus effected via the wider openings 10. All the surface of the filter 1 is thus used no matter what the inlet flow rate.

Figure 5:
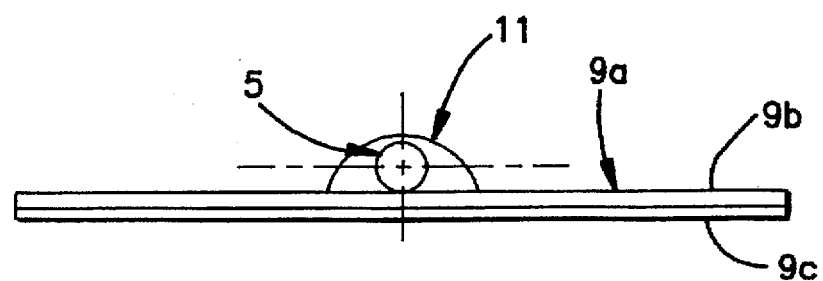
FIG. 5 is a fragmentary cross-sectional view of a distribution tube provided with protection means and with which is associated distribution means.

According to a preferred embodiment of the filter 1 according to the invention, shown in FIG. 5, the distribution tubes 5a are covered respectively by protective means 11 adapted to avoid obstruction of the perforations 7 or the wider openings 10. This protective means 11 is present in the form of a return gutter of a diameter greater than that of the distribution tubes 5a, thereby avoiding prevention of the good operation of the perforations 7 and of the wider openings 10.

In the embodiment shown in FIG. 5, the return gutters 11 have a diameter of about 100 mm.

To protect the layer 8 of granular filtrant, there can be provided a protection layer 12 in which is located the distribution network 5. This protective layer 5 is adjacent the layer 8 of granular filtrant at its first surface 8a and is preferably a layer of washed gravel, of a thickness of about 5 to 10 cm.

Finally, the filter 1 comprises an external casing 13 in which are disposed the two networks of tubes respectively distribution 5 and drainage 6, the filter means 8 interposed between the two networks 5 and 6 and the distribution means 9 associated with the distribution tube network 5, this casing comprising the inlet 2 and the outlet 3.

Figure 2:
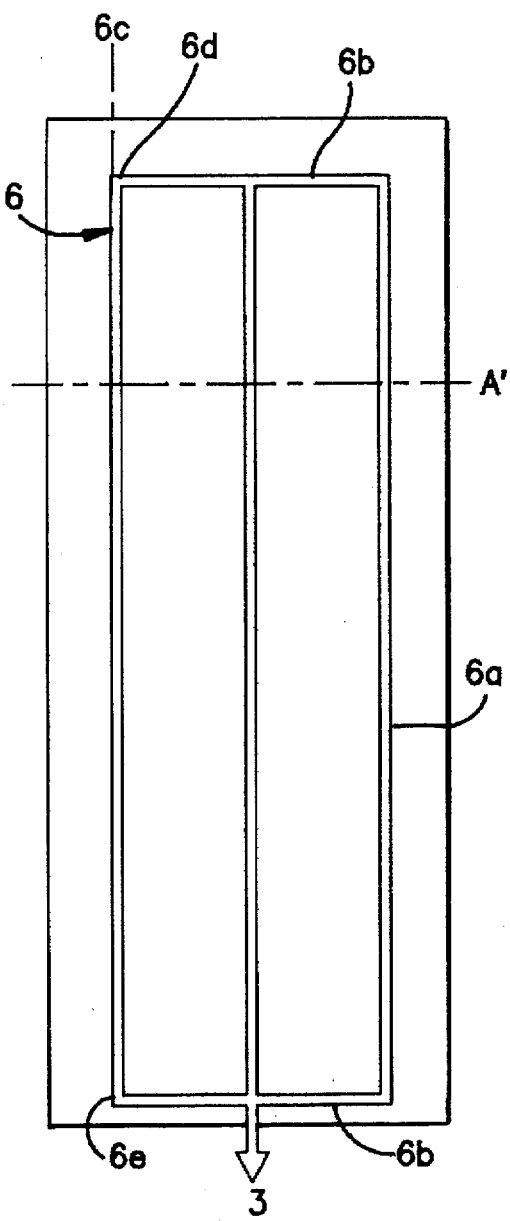
FIG. 2 is a bottom plan view of the filter shown in FIG. 1.

In the embodiment shown in FIG. 2, the casing 13 is of U-shape but it could also be of U-shape with a closed opening.

Moreover, according to another embodiment, this casing 13 can be replaced by a concrete tank with sealed walls built in place.

We claim:

1. Filter for the purification of water comprising:

an inlet for water to be treated;

an outlet for treated water;

filter means comprising at least one layer of granular filtrant, having a first upper surface and a second lower surface;

a network of distribution tubes communicating with said inlet, said network of distribution tubes being located outside said filter means and above said first upper surface; said network of distribution tubes comprising at least one layer of several tubes spaced transversely from each other and in communication with each other;

a network of drainage tubes communicating with said outlet, said network of drainage tubes being located within said layer of filter means and adjacent said second lower surface; said network of drainage tubes comprising at least one layer of several tubes spaced transversely from each other and in communication with each other;

said filter means being interposed between said network of distribution tubes and said network of drainage tubes;

said two networks being disposed substantially opposite and spaced from each other, and provided with perforations;

distribution means for absorption and diffusion of water, said distribution means comprising at least one layer interposed between said first upper surface and said network of distribution tubes, so that water to be treated and coming from said inlet and said network of distribution tubes is absorbed and diffuses towards said filter means and is recovered by said network of drainage tubes and said outlet.

2. Filter according to claim 1, wherein the network of distribution tubes is located in a protective layer which is adjacent to the first upper surface of the layer of granular filtrant.

3. Filter according to claim 2, wherein the protective layer is a layer of washed gravel.

4. Filter according to claim 1, wherein the perforations of the network of distribution tubes are disposed substantially perpendicular to the thickness of the layer of granular filtrant.

5. Filter according to claim 1, wherein the distribution tubes have openings, which are wider than the perforations, and distributed longitudinally, opposite the first surface of the layer of granular filtrant.

6. Filter according to claim 1, wherein the distribution tubes are covered respectively with protective means adapted to avoid obstructions of the perforations without preventing distribution of the water.

7. Filter according to claim 6, wherein the protective means is a return gutter.

8. Filter according to claim 1, wherein the distribution means comprise water absorption and diffusion strips interposed between the network of distribution tubes and the filter means.

9. Filter according to claim 8, wherein the strips for absorption and diffusion of water are present in the direction of diffusion of the water and include successively a draining layer and a fine filtering layer.

10. Filter according to claim 8, wherein the distribution tubes are disposed in the midportion of the absorption and diffusion strips.

11. Filter according to claim 1, wherein the layer of granular filtrant comprises granules of zeolite, having a granulometry comprised between about 0.1 and 10 mm.

12. Filter according to claim 1, wherein the network of drainage tubes comprises at least one layer of several tubes spaced transversely from each other and in communication with each other adjacent the outlet.

13. Filter according to claim 1, further including an external casing in which are disposed the two networks of tubes respectively for distribution and drainage, and said casing comprising an inlet and an outlet.

14. Filter according to claim 13, wherein the casing is of U-shape.

15. Filter according to claim 13, wherein the casing is of U-shape whose opening is closed.

16. Filter according to claim 1 further including a siphon startable by a pressure bell, said siphon being fluidly connected to the inlet of the filter and being located in a supply tank.

17. System for the treatment of water comprising a discontinuous supply system comprising a supply tank in which is located a siphon startable by a pressure bell, said siphon being fluidly connected to the inlet of a filter according to claim 1.

18. System according to claim 17, wherein the filter is disposed substantially horizontally.

19. System for the treatment of water comprising a discontinuous supply system comprising a supply tank in which is located a swinging spout which is fluidly connected to the inlet of a filter according to claim 1.

20. System for the treatment of water comprising a discontinuous supply system comprising a supply tank in which is located an electric pump with a high and low level detector, said pump being fluidly connected to the inlet of a filter according to claim 1.

* * * * *